(12) United States Patent
Natanzon et al.

(10) Patent No.: US 10,592,128 B1
(45) Date of Patent: Mar. 17, 2020

(54) ABSTRACTION LAYER

(71) Applicant: EMC Corporation, Hopkinton, MA (US)

(72) Inventors: Assaf Natanzon, Tel Aviv (IL); Jehuda Shemer, Kfar Saba (IL); Ron Bigman, Holon (IL); Amit Lieberman, Raanana (IL); Yana Vaisman, Netanya (IL); Oded Peer, Raanana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 18 days.

(21) Appl. No.: 14/984,279

(22) Filed: Dec. 30, 2015

(51) Int. Cl.
*G06F 3/06* (2006.01)

(52) U.S. Cl.
CPC .......... *G06F 3/0619* (2013.01); *G06F 3/065* (2013.01); *G06F 3/067* (2013.01); *G06F 3/0665* (2013.01)

(58) Field of Classification Search
CPC ...... G06F 3/065; G06F 3/0665; G06F 3/0619; G06F 3/067; G06F 17/30191; G06F 17/30185
See application file for complete search history.

(56) References Cited

U.S. PATENT DOCUMENTS

| | | | |
|---|---|---|---|
| 7,636,814 B1* | 12/2009 | Karr | G06F 12/0804 711/143 |
| 7,647,329 B1* | 1/2010 | Fischman | G06F 17/30094 707/999.1 |
| 8,356,015 B1* | 1/2013 | Suryanarayanan | G06F 16/128 707/687 |
| 8,429,362 B1* | 4/2013 | Natanzon | G06F 11/1471 711/161 |
| 8,726,066 B1* | 5/2014 | Natanzon | G06F 11/2069 714/4.11 |
| 9,189,339 B1* | 11/2015 | Cohen | G06F 11/1412 |
| 9,235,481 B1* | 1/2016 | Natanzon | G06F 11/14 |
| 9,336,230 B1* | 5/2016 | Natanzon | G06F 17/30212 |
| 9,411,535 B1* | 8/2016 | Shemer | G06F 3/0655 |
| 9,442,938 B1* | 9/2016 | Srivastav | G06F 17/30091 |
| 9,557,925 B1* | 1/2017 | Natanzon | G06F 3/0619 |
| 2003/0041211 A1* | 2/2003 | Merkey | G06F 11/1076 711/114 |
| 2005/0027892 A1* | 2/2005 | McCabe | G06F 3/0626 709/253 |
| 2006/0047713 A1* | 3/2006 | Gornshtein | G06F 17/30575 |
| 2006/0106878 A1* | 5/2006 | Shitomi | G06F 17/30067 |
| 2008/0168218 A1* | 7/2008 | Arakawa | G06F 11/1456 711/112 |
| 2010/0077160 A1* | 3/2010 | Liu | G06F 3/0482 711/162 |
| 2010/0199109 A1* | 8/2010 | Terek | G06F 3/0608 713/194 |

(Continued)

*Primary Examiner* — Michael Krofcheck
(74) *Attorney, Agent, or Firm* — Daly, Crowley, Mofford & Durkee, LLP

(57) ABSTRACT

A computer implemented method, system, and computer program product comprising intercepting an interaction with a data storage capability at the abstraction layer enabled to intercept data interactions for different types of data storage capabilities; wherein the interaction changes data on the data storage capability; sending a copy of the interaction to a replication data storage capability; and sending the interaction to the data storage capability.

14 Claims, 17 Drawing Sheets

(56) References Cited

U.S. PATENT DOCUMENTS

| | | | | |
|---|---|---|---|---|
| 2010/0274985 A1* | 10/2010 | Yamagami | .......... | G06F 11/1471 |
| | | | | 711/162 |
| 2011/0022601 A1* | 1/2011 | Elrom | ............... | G06F 17/30067 |
| | | | | 707/747 |
| 2013/0246458 A1* | 9/2013 | Iliev | ................. | G06F 17/30091 |
| | | | | 707/770 |
| 2015/0317330 A1* | 11/2015 | Bolotskikh | ....... | G06F 17/30076 |
| | | | | 707/827 |
| 2015/0373114 A1* | 12/2015 | Hanaway | .............. | G06F 3/0605 |
| | | | | 709/213 |
| 2016/0117322 A1* | 4/2016 | Ramaswamy | .... | G06F 17/30958 |
| | | | | 707/756 |
| 2016/0267132 A1* | 9/2016 | Castellanos | ....... | G06F 17/30132 |
| 2016/0371145 A1* | 12/2016 | Akutsu | .................... | G06F 3/06 |

* cited by examiner

ABSTRACTION LAYER

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This Application is related to U.S. patent application Ser. No. 14/984,265 entitled "OBJECT REPLICATION" and Ser. No. 14/984,301 entitled "CLOUD TIERING" filed on Dec. 30, 2015; U.S. application Ser. No. 14/868,884 entitled "MULTI POINT IN TIME OBJECT STORE" filed on Sep. 29, 2015; U.S. application Ser. No. 14/868,879 entitled "CLOUD OBJECT STORE VIRTUALIZATION" filed on Sep. 29, 2015; and U.S. application Ser. No. 14/870,088 entitled "CLOUD AGNOSTIC REPLICATION" filed on Sep. 30, 2015. The teachings of the afore mentioned applications are herein incorporated by reference in their entirety.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A computer implemented method, system, and computer program product comprising intercepting an interaction with a data storage capability at the abstraction layer enabled to intercept data interactions for different types of data storage capabilities; wherein the interaction changes data on the data storage capability; sending a copy of the interaction to a replication data storage capability; and sending the interaction to the data storage capability.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
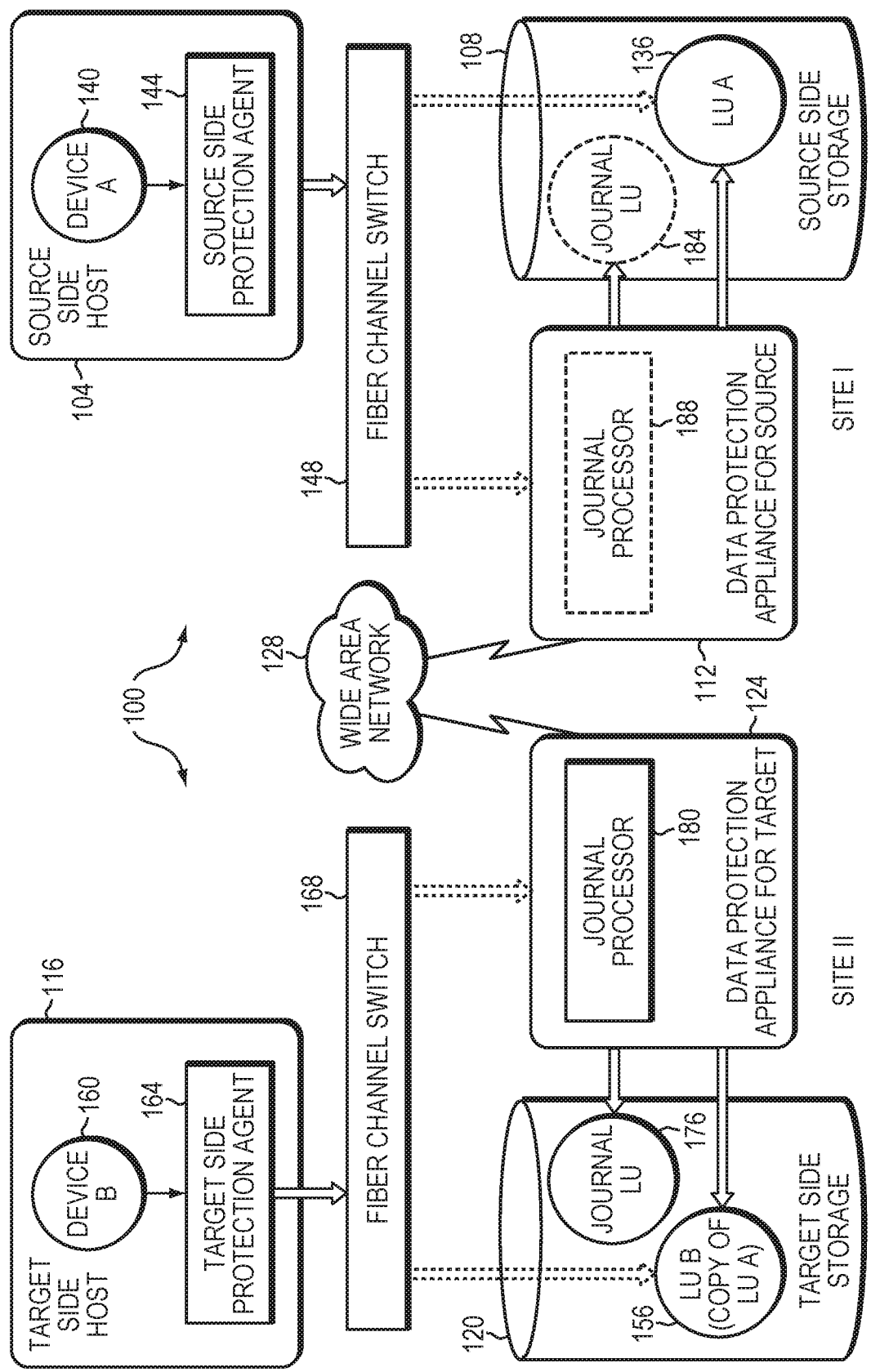
FIG. 1 is a simplified illustration of a data protection system, in accordance with an embodiment of the present disclosure.

In many embodiments, the current disclosure may enable consistent points in time across multiple data sources. In some embodiments, sources or data sources may include one or more file systems, databases, object stores, volumes, block stores, and other data sources. In certain embodiments, a splitter may be an object that intercepts block IO and sends a copy of the IO data to a replication site. In other embodiments, a splitter may be an object that intercepts data for a particular data source and sends a copy of that data to a protection appliance. In many embodiments, an abstraction layer may be one or more splitters layered across multiple data sources. In certain embodiments, an abstraction layer may include a block splitter or block abstraction layer. In other embodiments, an abstraction layer may include an object splitter or object abstraction layer. In further embodiments, an abstraction layer may include a file system splitter or file system abstraction layer. In most embodiments, a splitter for a given data source is enabled to intercept data commands for that data source. In many embodiments, a splitter may be able to replicate an intercepted data command for a given data source.

In some embodiments, an abstraction layer may combine splitters or abstraction layers of different types of data sources. In most embodiments, an abstraction layer may enable creation of a consistent point in time across data sources. In a particular embodiment, an abstraction layer may enable creation of a consistent point in time across 5 block volumes, a file system, 3 data bases and an object store. In further embodiments, an abstraction layer may also include one or more cloud splitters or abstraction layers.

In many embodiments, an abstraction layer may replicate data to a replication protection appliance. In most embodiments, a replication appliance may track replicated data in a journal. In some embodiments, there may be a separate journal for each type of data service replicated. In other embodiments, there may be a single journal for each type of data service replicated. In certain embodiments, each type of replicated data service may be split by an abstraction layer to a replication protection appliance. In other embodiments, replicated data services may be split by an abstraction layer to multiple appliances. In further embodiments, a replication appliance may add a counter to each piece of replicated data across all replicated data sources.

In many embodiments, a counter may be used to order replicated data across multiple data services. In other embodiments, an abstraction layer may quiesce all data services to create a consistent point in time across all data services. In certain embodiments, a replication appliance may quiesce one or more data services by not sending acknowledgements of data intercepted for each data source.

In further embodiments, data intercepted to an abstraction layer may send a copy of the data to the RPA. In certain embodiments, an RPA may number data packets as they arrive from different data sources. In many embodiments, numbered data packets may enable write-order fidelity between all sources. In further embodiments, once a data packet is numbered, an RPA may acknowledges the packet to an abstraction layer, which may forwards the packet to the original destination. In other embodiments, an RPA may send data to a replica journal. In certain embodiments, an RPA may monitor data sources and periodically, and if no IO errors occurred during that time, mark a point in time as consistent. In other embodiments, if an error occurs during a time window, then a resync of sources may take place to a point that it is determined that lost data has been retrieved and verified.

In another embodiment, an abstraction layer may quiesce data transfer to a back-end in a coordinated way or may stop acknowledging incoming requests. In many embodiments, if data sources are quiesced, data may be flushed. In other embodiments, given that data sources are quiesced, a consistent point of time may be taken. In other embodiments, an abstraction layer may enable a consistent point of time across consistency groups.

The following may be helpful in understanding the specification and claims:

BACKUP SITE—may be a facility where replicated production site data is stored; the backup site may be located in a remote site or at the same location as the production site; a backup site may be a virtual or physical site; a backup site may be referred to alternatively as a replica site or a replication site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site.

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage VMFS: may be a virtual machine file system, a file system provided by VMware for storing a virtual machine VMDK: may be a virtual machine disk file containing a disk data in a VMFS. Analog to a LUN in a block storage array Virtual RPA (vRPA)/Virtual DPA (vDPA): may be a DPA running in a VM.

VASA may be vSphere Storage application program interfaces (APIs) for Storage Awareness.

MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332, 687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341,115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time. During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators. Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands. In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
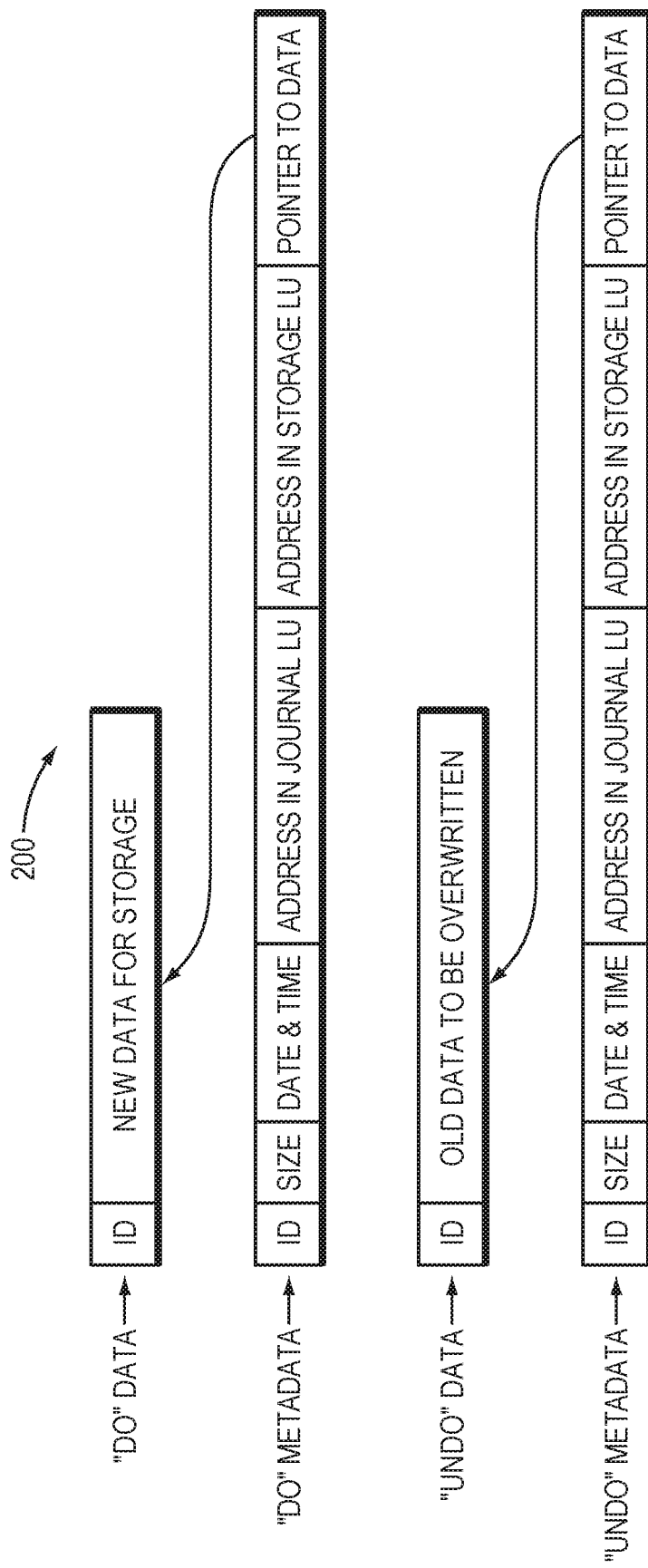
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Abstraction Layer

Figure 3:
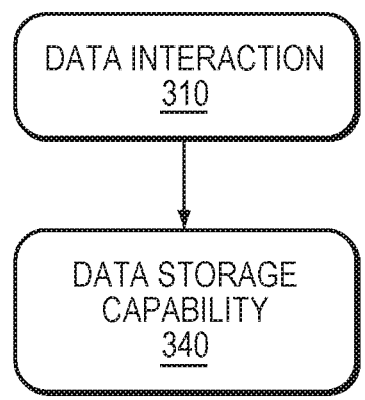
FIG. 3 is a simplified illustration data access and data, in accordance with an embodiment of the present disclosure.

Refer now to the example embodiment of FIG. 3, which illustrates a data interaction. Data interaction 310 interacts with data storage capability 340. In this embodiment, Data interaction 310 represents a generic interaction with Data storage capability 340.

In certain embodiments, a data interaction may write data. In other embodiments a data interaction may modify data on a data storage capability. In some embodiments, data may be a stored on a volume. In other embodiments, data may be stored in an object store. In other embodiments, data may be stored in a database. In many embodiments, data may be stored in a file system. In most embodiments, data may be a generic way of referencing stored information in a computer system. In most embodiments, a data interaction may be a way to interact with data stored in a computer system including reading the data, modifying the data, writing data, and/erasing data. In certain embodiments, a data storage capability may be an object store. In other embodiments a data storage capability may be a database. In further embodiments, a data storage capability may be block storage. In other embodiments, a data storage capability may be a volume.

Figure 4:
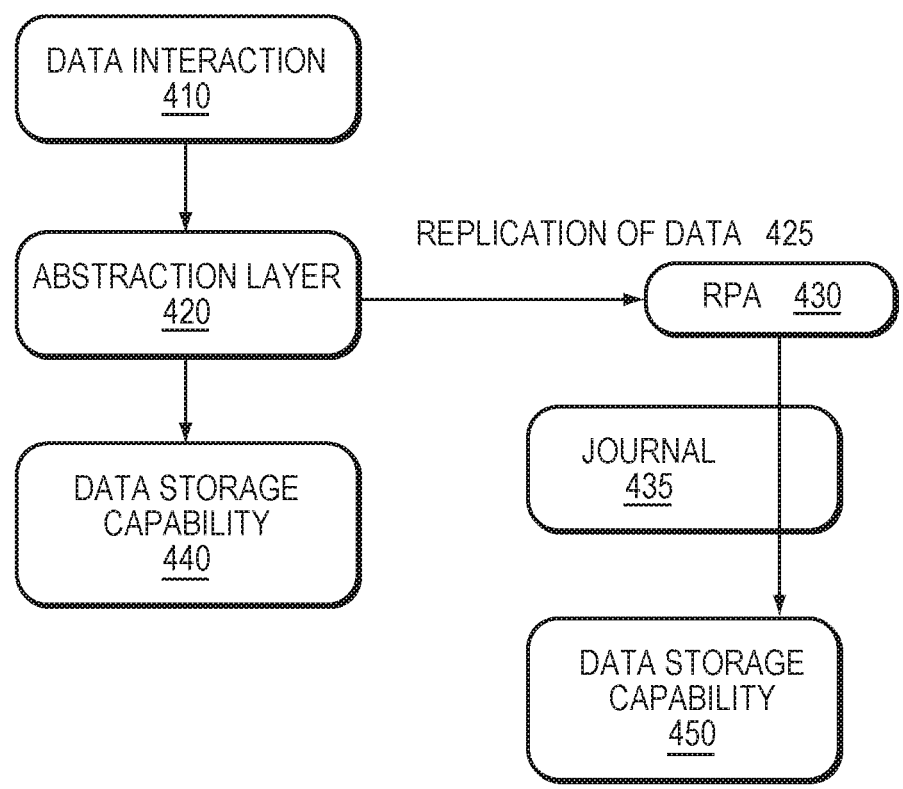
FIG. 4 is a simplified illustration of replication of data using an abstraction layer, in accordance with an embodiment of the present disclosure.

Refer now to the example embodiment of FIG. 4, which represents an abstraction layer. Abstraction layer 420 is located between data interaction 410 and data storage capability 440. Abstraction layer intercepts data interaction 410 before it reaches data storage capability 440. Abstraction layer 420 enables replication of data 425 of data interaction 410 to RPA 430. RPA 430 stores data interaction in data storage capability 450 using journal 435. In this embodiment, RPA may write data interaction 410 to journal 435 before it is written to data storage capability 450. Abstraction layer 420 also sends data interaction 410 to data storage capability 440.

Figure 5:
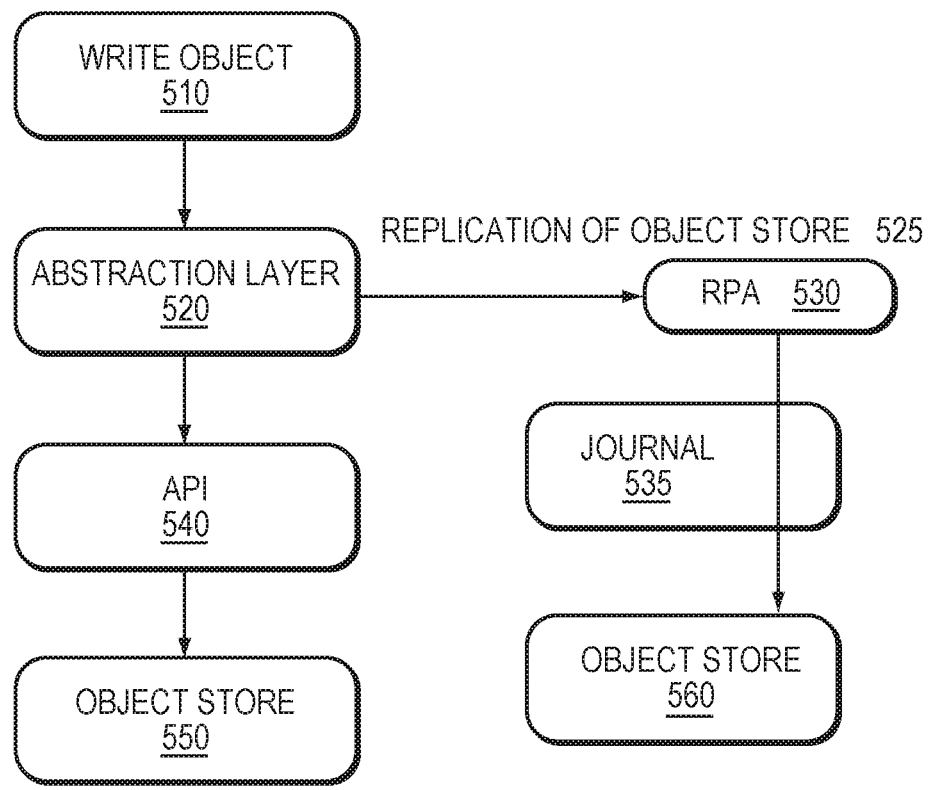
FIG. 5 is a simplified illustration replication of an object store using an abstraction layer, in accordance with an embodiment of the present disclosure.

Refer now to the example embodiment of FIG. 5, which illustrates replication of an object store. In the example embodiment of FIG. 5, write object 510 is intercepted by abstraction layer 520. Abstraction layer 520 replicates object 510 to RPA 530. RPA 530 causes the object of write object 510 to be replicated to object store 560. Abstraction layer 520 sends object to API 540, which writes object to object store 550. In these embodiments, abstraction layer 520 exposes the same API as the API of API 540 and sends received commands to RPA 530 and to API 540.

Figure 6:
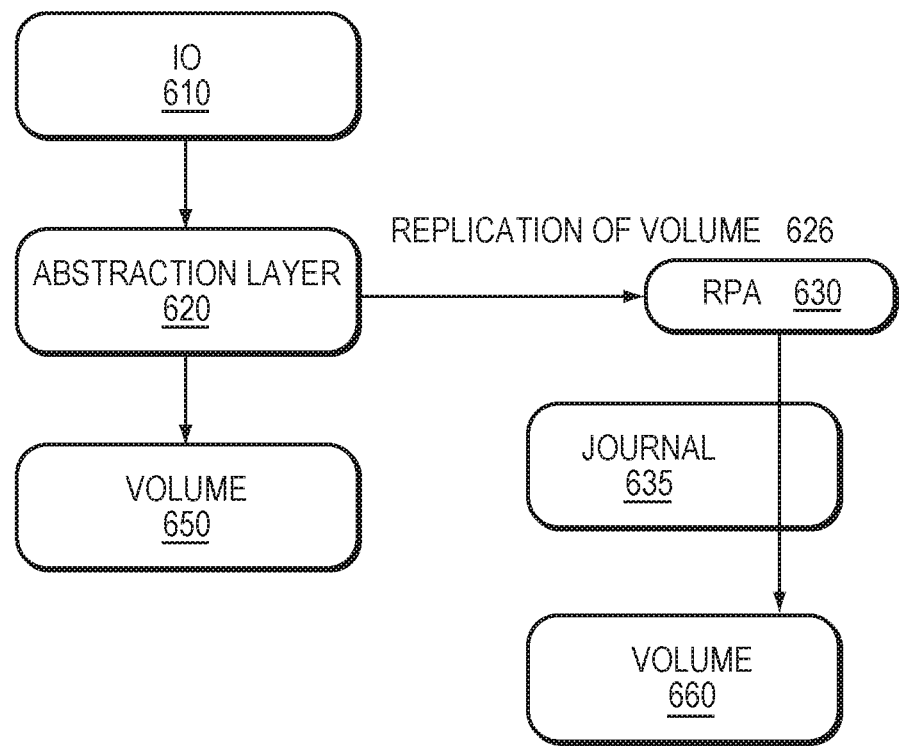
FIG. 6 is a simplified illustration replication of a volume using an abstraction layer, in accordance with an embodiment of the present disclosure.

Refer now to the example embodiment of FIG. 6, which illustrates replication of a volume. IO 610 is intercepted by abstraction layer 620. Abstraction layer 620 sends IO to RPA 630 which replicates IO 610 using journal 635 to volume 660. Abstraction layer 620 sends IO 610 to volume 640.

Figure 7:
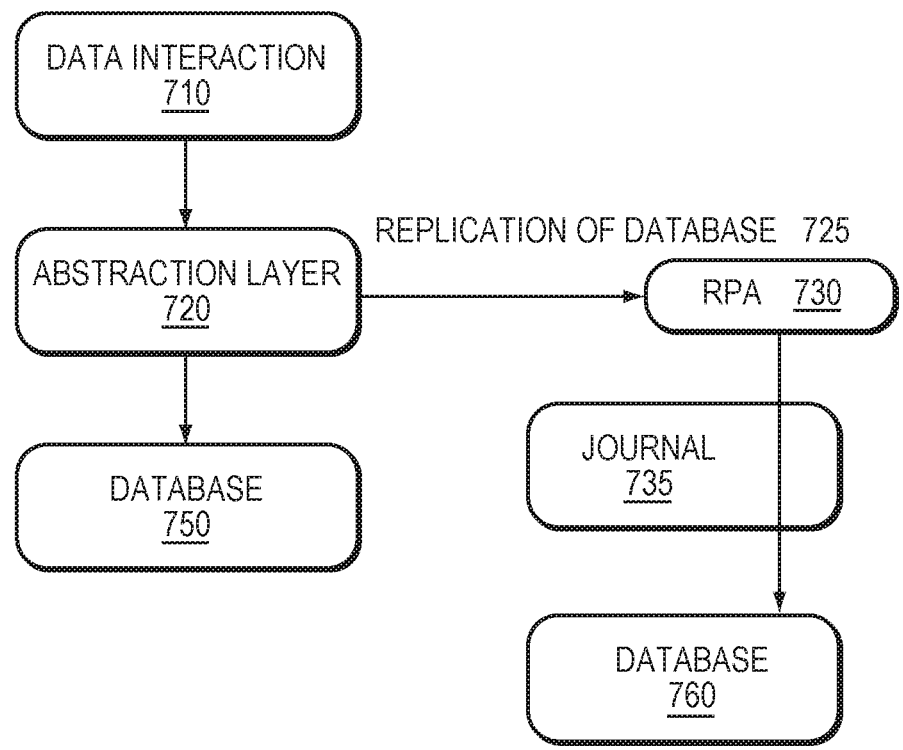
FIG. 7 is a simplified illustration replication of a database using an abstraction layer, in accordance with an embodiment of the present disclosure.

Refer now to the example embodiment of FIG. 7, which illustrates replication of a database. Database interaction 710 is intercepted at abstraction layer 720. Abstraction layer 720 replicated database 750 by splitting data interaction 710 to RPA 730. RPA 730 replicates database interaction 710 to database 760. Abstraction layer 720 sends data interaction 710 to database 750. In certain embodiments, a database may be an SQL DB and an abstraction layer may intercept SQL commands.

Figure 8:
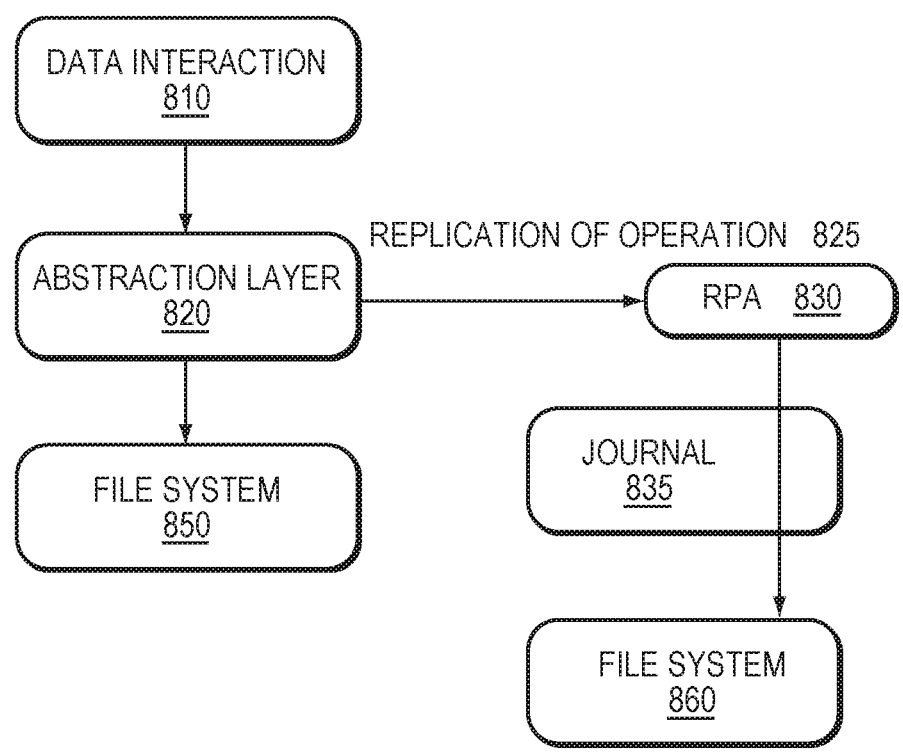
FIG. 8 is a simplified illustration replication of a file system using an abstraction layer, in accordance with an embodiment of the present disclosure.

Refer now to the example embodiment of FIG. 8, which illustrates replication of a file system. In FIG. 8, abstraction layer 820 intercepts data interaction 810 to file system 850. Abstraction layer 820 replicates file system 850 by sending a copy of data interaction 810 to RPA 830. RPA 830 sends data interaction 810 to file system 860 and may store the interaction in journal 835. In some embodiments, an abstraction layer may expose a file system API. In certain embodiments, an abstraction layer may expose an NFS file system and write the actual file commands (open file, write to file, seek, truncate to a lower layer).

Figure 9:
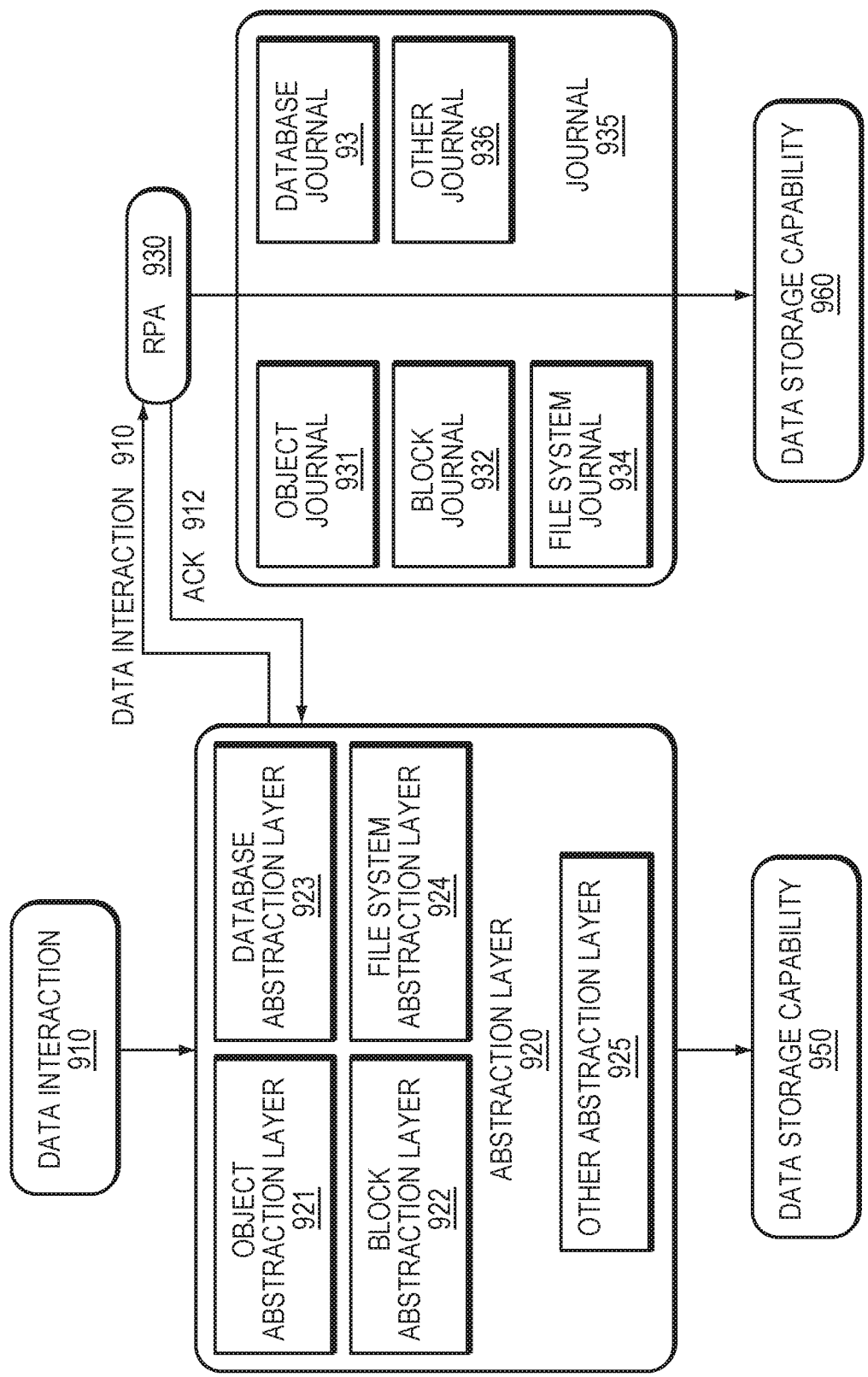
FIG. 9 is an alternative simplified illustration of replication of data using an abstraction layer, in accordance with an embodiment of the present disclosure.
Figure 11:
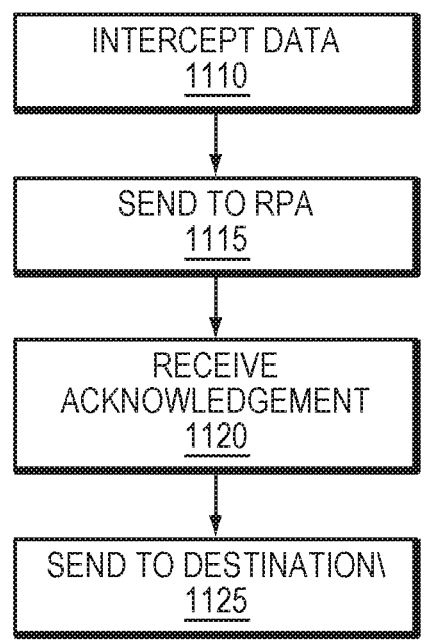
FIG. 11 is a simplified example of a method of replication using an abstraction layer, in accordance with an embodiment of the present disclosure.

Refer now to the example embodiments of FIGS. 9 and 11, which illustrate an abstraction layer enabled to replicate different data sources. Data interaction 910 is intercepted by abstraction layer 920 (step 1110). Abstraction layer 920 has abstraction layer object 921, abstraction layer database 923, abstraction layer block 922, file system abstraction layer 924, and abstraction layer other 925. In this embodiment, abstraction layer 920 is enabled to intercept different data interactions such as objection interactions, database interactions, block interactions, and file system interactions. Abstraction layer 920 replications data interactions such as data interaction 910 to RPA 930 (step 1115). RPA 930 replicates data interaction 910 to data storage capability 960. Data interaction 910 may be stored in journal 935. Journal 935 has object journal 931, block journal 932, database journal 933, file system journal 935, and other journal 936.

RPA 930 sends acknowledgement 912 which is received by abstraction layer 920 (step 1120). Abstraction layer 920 sends data interaction 910 to storage capability 950 (step 1125). In many embodiments, a data storage capability may include one or more of block, file, object, file system, database, or other types of storage capabilities.

Figure 10:
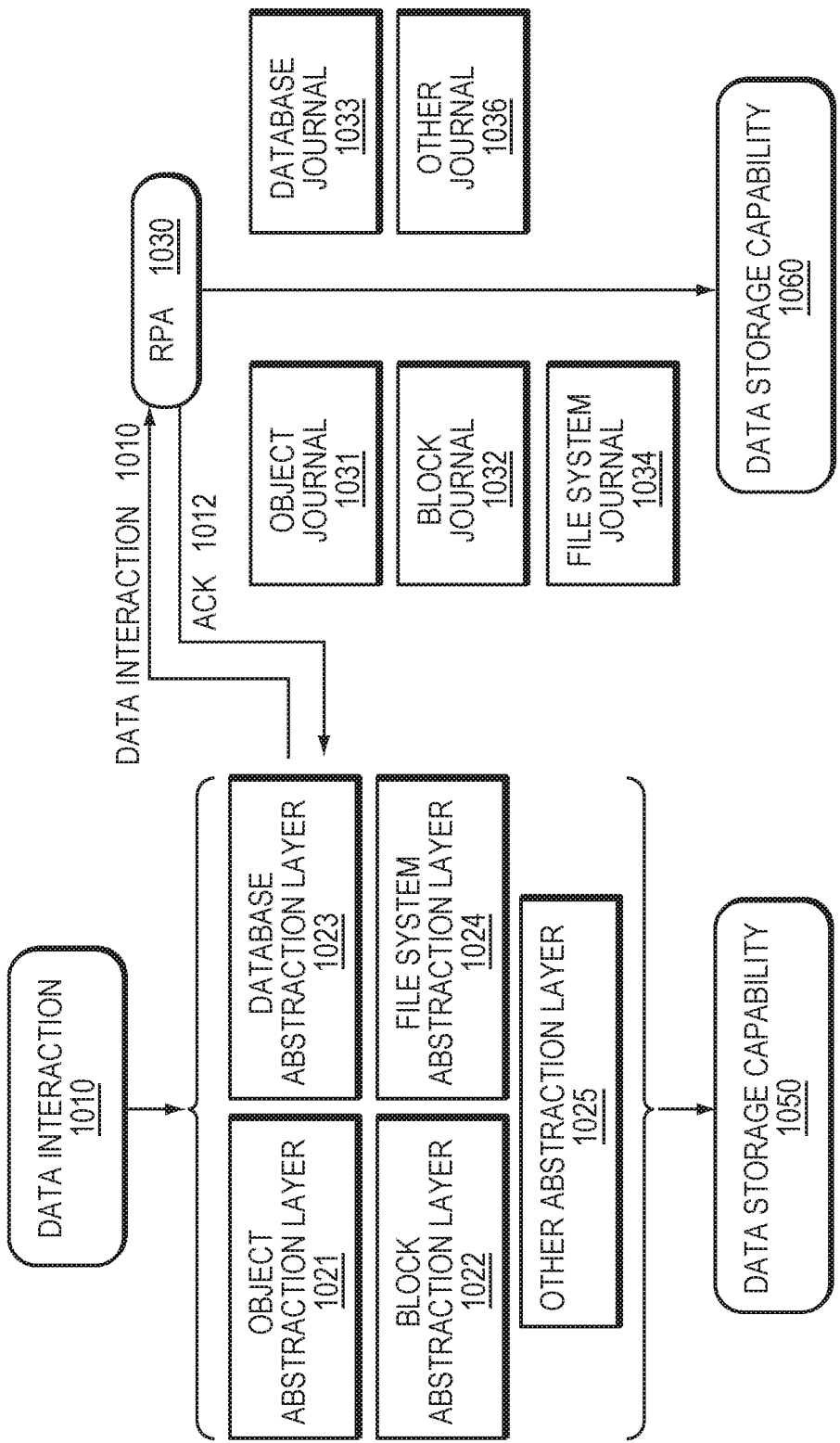
FIG. 10 is an alternative simplified illustration of replication of data using abstraction layers, in accordance with an embodiment of the present disclosure.

Refer now to the example embodiments of FIGS. 10 and 11, which illustrate a set of abstraction layers enabled to replicate different data sources. Data interaction 1010 is intercepted by one of abstraction layer object 1021, abstraction layer database 1023, abstraction layer block 1022, file system abstraction layer 1024, and abstraction layer other 1025 depending on whether it is a database, object, file system, block, or other type data interaction. In this embodiment, abstraction layer 1020 is enabled to intercept different data interactions such as objection interactions, database interactions, block interactions, and file system interactions. Abstraction layer 1020 replications data interactions such as data interaction 1010 to RPA 930 (step 1115). RPA 1030 replicates data interaction 1010 to data storage capability 1060. Data interaction 1010 may be stored in object journal 1031, block journal 1032, database journal 1033, file system journal 1035, and other journal 1036 depending on the type of data interaction. RPA 1030 sends acknowledgement 1012 which is received by the corresponding abstraction layer that send data interaction 1010 to RPA (step 1120). The corresponding abstraction layer sends data interaction 1010 to storage capability 1050 (step 1125).

Figure 12:
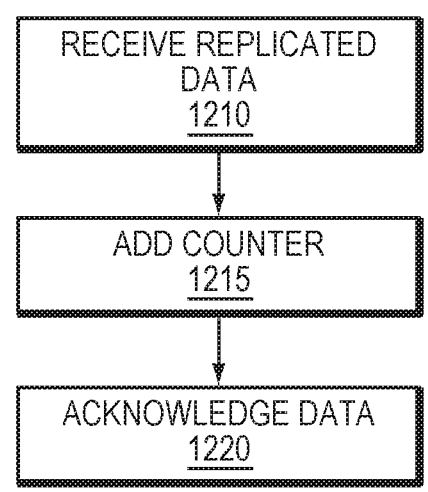
FIG. 12 is a simplified example of a method of creating a consistent point in time using an abstraction layer, in accordance with an embodiment of the present disclosure.

Refer now to FIGS. 9 and 12, which illustrate an example embodiment of replicating the data. RPA 930 receives replicated data from abstraction layer 920 (step 1210). RPA 930 adds a counter to the object (step 1215). RPA 930 acknowledges the data to abstraction layer 920. By adding a counter to the data as it is replicated, the processing time of each replicated piece of data may be known in sequence to each other piece of replicated data.

Figure 13:
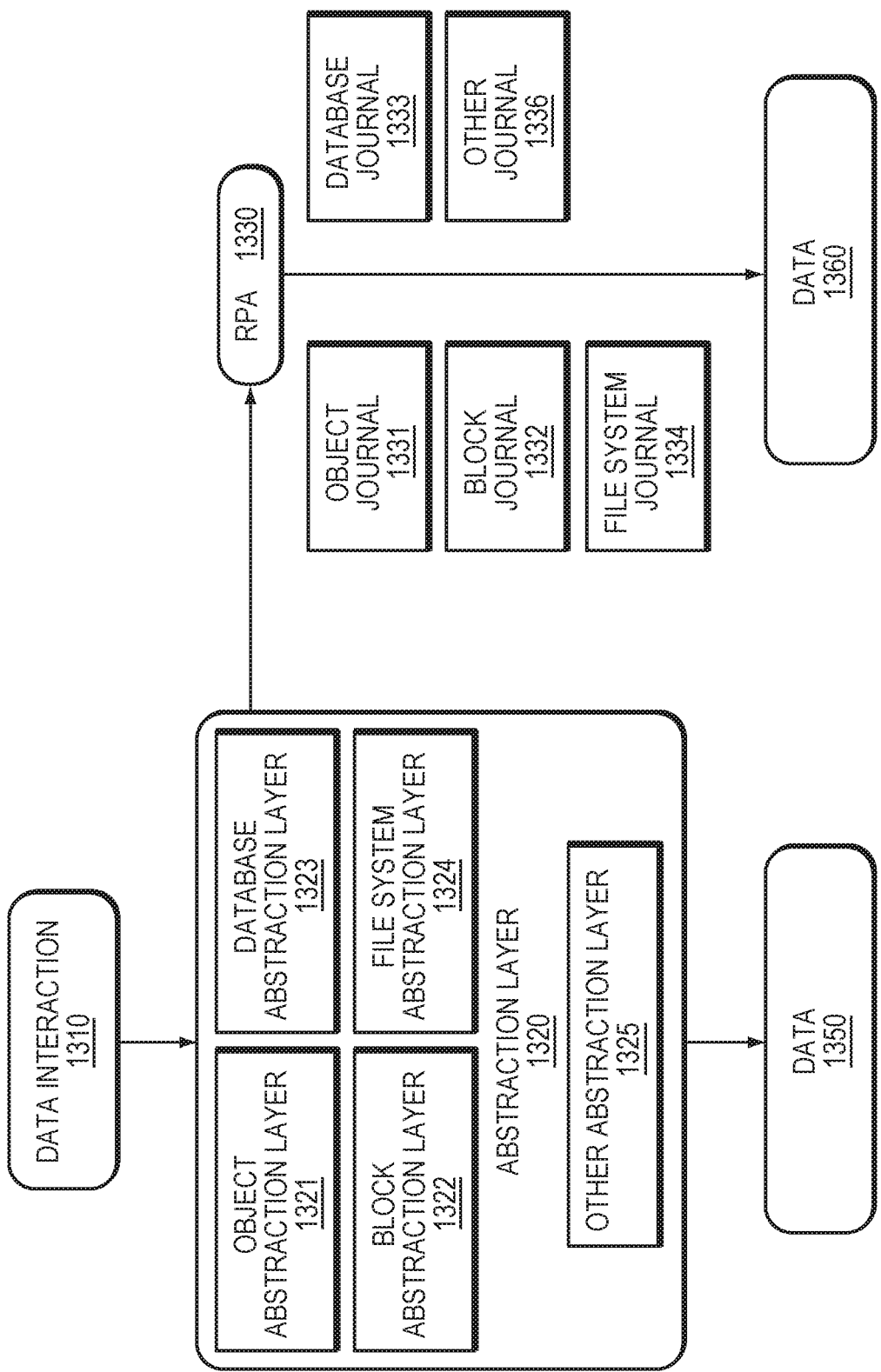
FIG. 13 is a further alternative simplified illustration of replication of data using abstraction layers, in accordance with an embodiment of the present disclosure.
Figure 14:
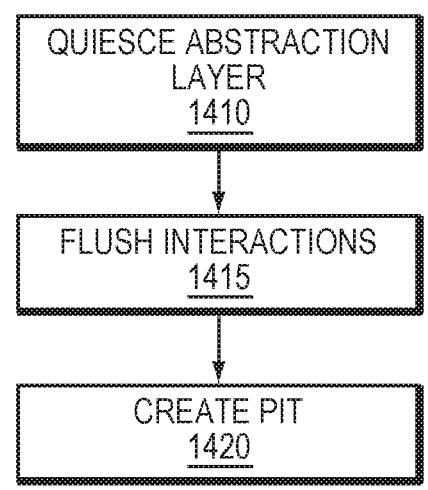
FIG. 14 is an alternative simplified example of a method of creating a consistent point in time using an abstraction layer, in accordance with an embodiment of the present disclosure.

Refer now to the example embodiments of FIGS. 13 and 14, which illustrate quiesing an abstraction layer to create a consistent point in time. Abstraction layer 1320 is quiesced (step 1410). Quiescing abstraction layer 1320 includes quiescing abstraction layer database 1323, abstraction layer object 1321, abstraction layer block 1322, abstraction layer file system 1324, and abstraction layer other 1325. (Step 1410). Data interactions in abstraction layer 1320 are flushed (step 1415). Flushing abstraction layer 1320 includes flushing abstraction layer database 1323, abstraction layer object 1321, abstraction layer block 1322, abstraction layer file system 1324, and abstraction layer other 1325. (Step 1410). A Point in time is created (step 1420). In this embodiment, once the data interactions are flushed, each of the abstractions layers are at the same point in time.

Figure 15:
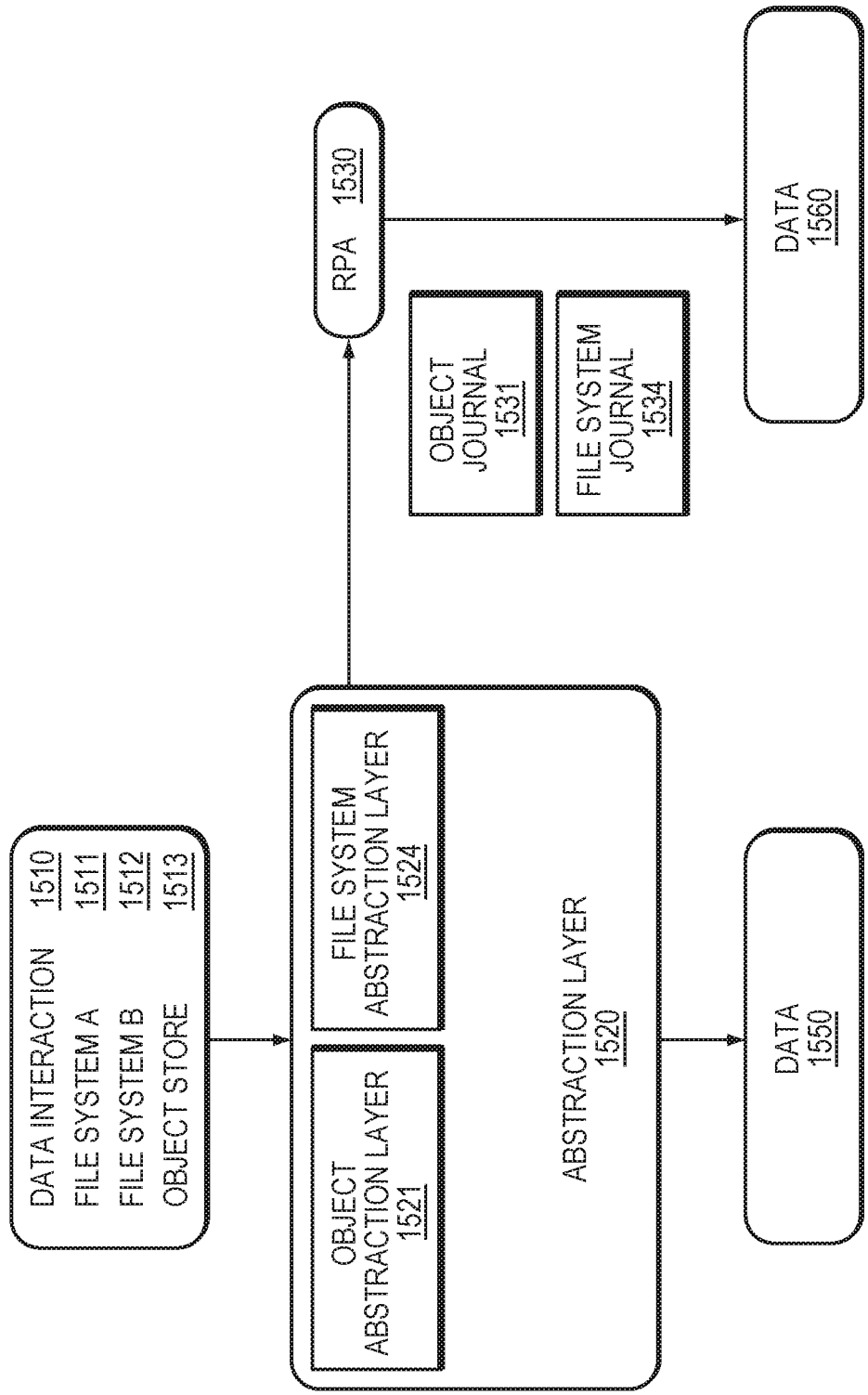
FIG. 15 is an alternative simplified example of a method of creating a consistent point in time using an abstraction layer, in accordance with an embodiment of the present disclosure.
Figure 16:
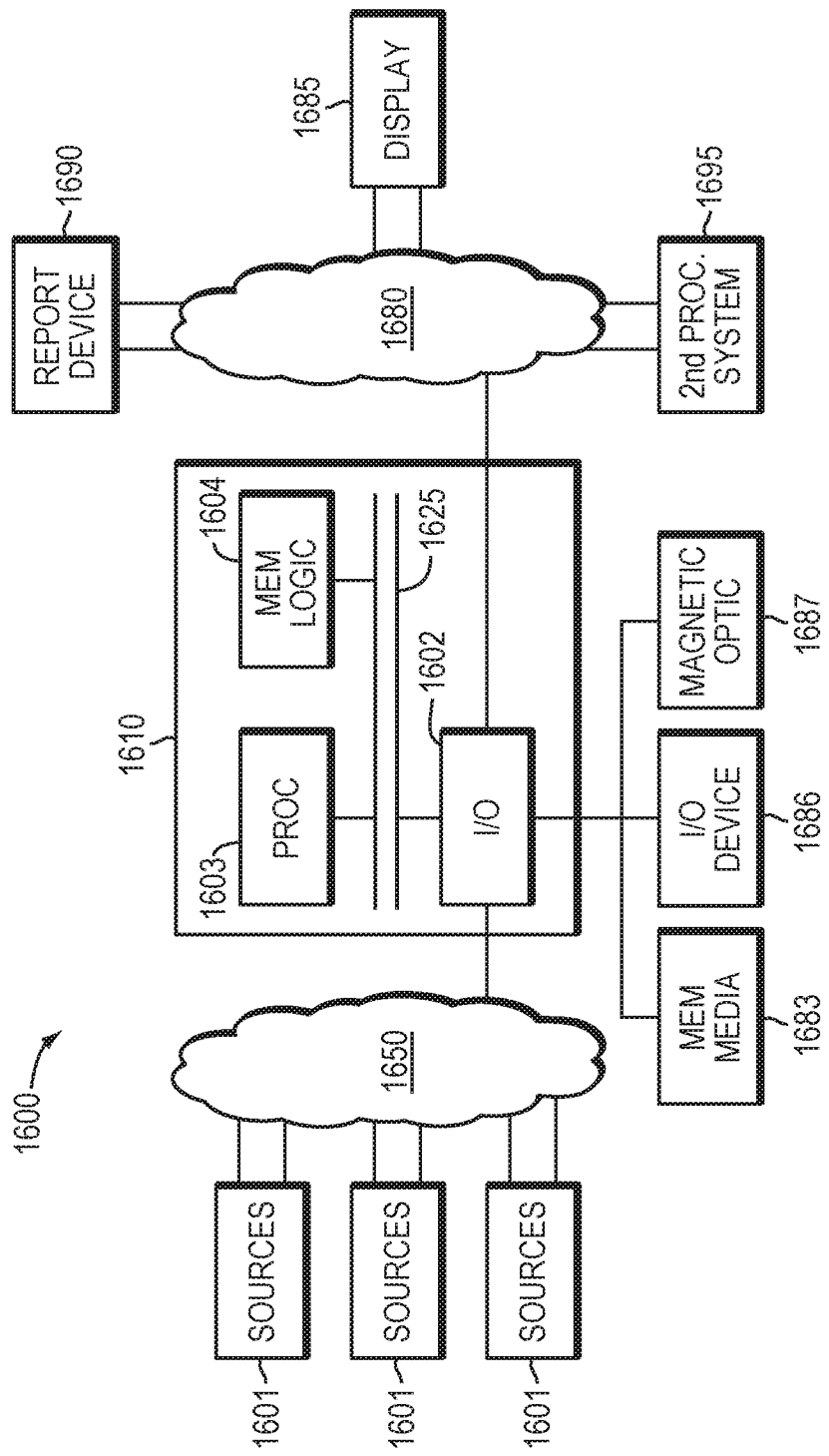
FIG. 16 is an example of an embodiment of an apparatus that may utilize the techniques described herein, in accordance with an embodiment of the present disclosure.
Figure 17:
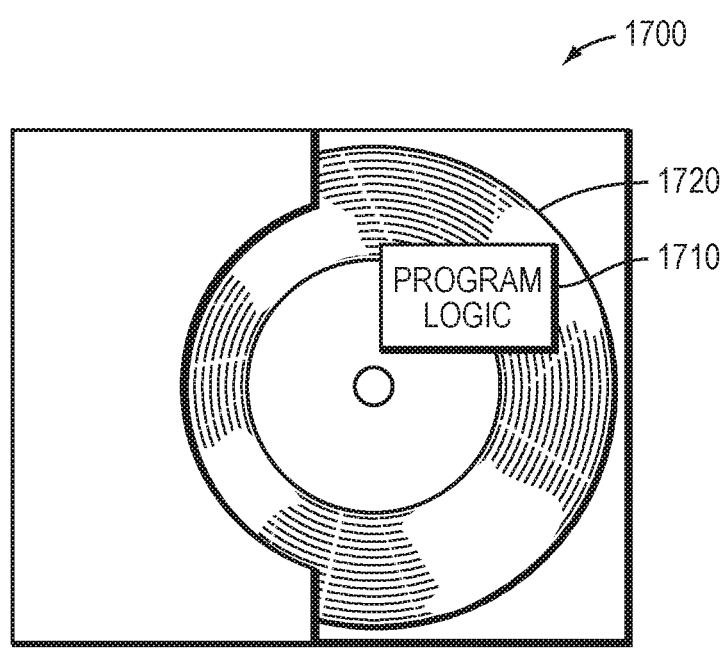
FIG. 17 is an example of an embodiment of a method embodied on a computer readable storage medium that may utilize the techniques described herein, in accordance with an embodiment of the present disclosure.

Refer now to the example embodiments of FIGS. 14 and 15, which illustrate quiesing an abstraction layer to create a consistent point in time. In these example embodiments, data interaction 1510 consists of interactions with file system A 1511, file system B 1512, and object store 1513. Abstraction layer 1520 has file system abstraction layer 1524 and object abstraction layer 1521. Abstraction layer 1520 is quiesced (step 1410). Quiescing abstraction layer 1320 includes quiescing abstraction object abstraction layer 1521, and file system abstraction layer 1524. Data interactions in abstraction layer 1520 are flushed (step 1415). Flushing abstraction layer 1320 includes flushing object abstraction layer 1521 and file system abstraction 1324 (Step 1410). A Point in time is created (step 1420).

In other embodiments, an abstraction layer may include any number of splitters or abstraction layers for any number of data sources. In many embodiments, a sequence number may be added per data type. In other embodiments, a sequence number may be added single splitter. In further embodiments, a sequence number may be added per single data type and the ordering between data type may be achieved for quiesed times. In further embodiments, time-stamps of each data type when quiesing may allow replica site to achieve a consistent point in time for all data types. In some embodiments, there may not be an undo journal or undo part of a journal. In certain embodiments, there may be a DO journal. In at least some embodiments, a DO journal may be applied to a create a consistent point in time.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor 1303 to provide a unique apparatus that operates analogously to specific logic circuits. As such a general purpose digital machine can be transformed into a special purpose digital machine. FIG. 14 shows Program Logic 1410 embodied on a computer-readable medium 1420 as shown, and wherein the Logic is encoded in computer-executable code configured for carrying out the reservation service process of this invention and thereby forming a Computer Program Product 1400. The logic 1410 may be the same logic 1340 on memory 1304 loaded on processor 1303. The program logic may also be embodied in software modules, as modules, or as hardware modules.

The logic for carrying out the method may be embodied as part of the system described below, which is useful for carrying out a method described with reference to embodiments shown in, for example, FIGS. 11, 12, 14, and 15. For purposes of illustrating the present invention, the invention is described as embodied in a specific configuration and using special logical arrangements, but one skilled in the art will appreciate that the device is not limited to the specific configuration but rather only by the claims included with this specification. A processor may be a physical or virtual processor.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system comprising:
    at least one processor; and
    a memory configured to store one or more processor-executable instructions implementing a set of abstraction layers including an object abstraction layer, a database abstraction layer, and a file system abstraction layer, the set of abstraction layers being configured to intercept a plurality of interactions with different data storage capabilities, the data storage capabilities comprising an object store, a database, and a file system, wherein, when executed by the at least one processor, the one or more processor-executable instructions cause the at least one processor to:
    intercept the plurality of interactions by using the set of abstraction layers, wherein intercepting the plurality of interactions includes: (i) intercepting an object interaction with the object abstraction layer, (ii) intercepting a database interaction with the database abstraction layer, and (iii) intercepting a file system interaction with the file system abstraction layer;
    split the plurality of interactions by using the set of abstraction layers, wherein splitting the plurality of interactions includes: (i) splitting the object interaction with the object abstraction layer, (ii) splitting the database interaction with the database abstraction layer, and (iii) splitting the file system interaction with the file system abstraction layer;
    quiesce each of the object abstraction layer, the database abstraction layer, and the file system abstraction layer by refraining from sending acknowledgements for intercepted data;
    flush each of the object abstraction layer, the database abstraction layer, and the file system abstraction layer; and
    create a consistent point-in-time across each of the data storage capabilities after the object abstraction layer, the database abstraction layer, and the file system abstraction layer have been flushed.

2. The system of claim 1 wherein the set of abstraction layers includes a different abstraction layer for each type of data storage capability.

3. The system of claim 2 wherein the data storage capabilities further comprise a file and a volume.

4. The system of claim 1 wherein the set of abstraction layers enables generation of a consistent point in time across the data storage capabilities.

5. A computer implemented method comprising:
    intercepting a plurality of interactions by using a set of abstraction layers including an object abstraction layer, a database abstraction layer, and a file system abstraction layer, wherein intercepting the plurality of interactions includes: (i) intercepting an object interaction with the object abstraction layer, (ii) intercepting a database interaction with the database abstraction layer, and (iii) intercepting a file system interaction with the file system abstraction layer;
    splitting the plurality of interactions by using the set of abstraction layers, wherein splitting the plurality of interactions includes: (i) splitting the object interaction with the object abstraction layer, (ii) splitting the database interaction with the database abstraction layer, and (iii) splitting the file system interaction with the file system abstraction layer;
    quiescing each of the object abstraction layer, the database abstraction layer, and the file system abstraction layer by refraining from sending acknowledgements for intercepted data;
    flushing each of the object abstraction layer, the database abstraction layer, and the file system abstraction layer, and
    creating a consistent point-in-time across each of a plurality of data storage capabilities after the object abstraction layer, the database abstraction layer, and the file system abstraction layer have been flushed, the plurality of data storage capabilities including an object store, a database, and a file system.

6. The method of claim 5 wherein the set of abstraction layers includes a different abstraction layer for each type of data storage capability.

7. The method of claim 6 wherein the data storage capabilities further comprise a file and a volume.

8. The method of claim 5 wherein the set of abstraction layers enables generation of a consistent point in time across the data storage capabilities.

9. A computer program product comprising:

a non-transitory computer readable medium encoded with computer executable program code, wherein the code enables execution across one or more processors of:

intercepting a plurality of interactions by using a set of abstraction layers including an object abstraction layer, a database abstraction layer, and a file system abstraction layer, wherein intercepting the plurality of interactions includes: (i) intercepting an object interaction with the object abstraction layer, (ii) intercepting a database interaction with the database abstraction layer, and (iii) intercepting a file system interaction with the file system abstraction layer;

splitting the plurality of interactions by using the set of abstraction layers, wherein splitting the plurality of interactions includes: (i) splitting the object interaction with the object abstraction layer, (ii) splitting the database interaction with the database abstraction layer, and (iii) splitting the file system interaction with the file system abstraction layer;

quiescing each of the object abstraction layer, the database abstraction layer, and the file system abstraction layer by refraining from sending acknowledgements for intercepted data;

flushing each of the object abstraction layer, the database abstraction layer, and the file system abstraction layer, and creating a consistent point-in-time across each of a plurality of data storage capabilities after the object abstraction layer, the database abstraction layer, and the file system abstraction layer have been flushed, the plurality of data storage capabilities including an object store, a database, and a file system.

10. The computer program product of claim 9 wherein the set of abstraction layers includes a different abstraction layer for each type of data storage capability.

11. The computer program product of claim 10 wherein the data storage capabilities further comprise a file and a volume.

12. The computer program product of claim 9 wherein the set of abstraction layers enables generation of a consistent point in time across the data storage capabilities.

13. The computer program product of claim 9 wherein the set of abstraction layers marks a point in time using a timestamp for each data storage capability.

14. The computer program product of claim 9 wherein the database interaction includes a SQL database interaction.

* * * * *